(12) United States Patent
Rother et al.

(10) Patent No.: US 12,131,511 B2
(45) Date of Patent: Oct. 29, 2024

(54) VEHICULAR DRIVER MONITORING SYSTEM WITH CAMERA VIEW OPTIMIZATION

(71) Applicant: Magna Electronics Inc., Auburn Hills, MI (US)

(72) Inventors: Marc Rother, Munich (DE); Jonathan D. Conger, Huntington Woods, MI (US); Steven V. Byrne, Goodrich, MI (US); Zhongyao Liu, Troy, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

(21) Appl. No.: 18/648,562

(22) Filed: Apr. 29, 2024

(65) Prior Publication Data
US 2024/0282069 A1 Aug. 22, 2024

Related U.S. Application Data

(63) Continuation of application No. 17/650,255, filed on Feb. 8, 2022, now Pat. No. 11,972,597.
(Continued)

(51) Int. Cl.
*G06V 10/147* (2022.01)
*B60R 1/04* (2006.01)
(Continued)

(52) U.S. Cl.
CPC .............. *G06V 10/147* (2022.01); *B60R 1/12* (2013.01); *B60R 11/04* (2013.01); *G03B 17/561* (2013.01);
(Continued)

(58) Field of Classification Search
CPC .. B60R 1/04; B60R 1/025; B60R 1/12; B60R 2001/1223; B60R 1/29; B60R 2001/1253;
(Continued)

(56) References Cited

U.S. PATENT DOCUMENTS 5,550,677 A 8/1996 Schofield et al.
5,567,360 A 10/1996 Varaprasad et al.
(Continued)

FOREIGN PATENT DOCUMENTS

GB 2527091 A 12/2015
WO 2022150826 A1 7/2022

*Primary Examiner* — Nathnael Aynalem
(74) *Attorney, Agent, or Firm* — HONIGMAN LLP (57) ABSTRACT

A vehicular driver monitoring system includes a camera disposed at a mirror head of an interior rearview mirror of a vehicle and viewing at least the head of a driver of the vehicle. The camera moves together and in tandem with the mirror head when the mirror head is adjusted by the driver of the vehicle to adjust a rearward view of the driver. Responsive to the driver of the vehicle adjusting the orientation of the mirror head, and responsive to processing at the ECU of image data captured by the camera, the vehicular driver monitoring system maintains the camera's view of at least the head of the driver as it was before the driver adjusted the orientation of the mirror head. The vehicular driver monitoring system, at least in part via processing at the ECU of image data captured by the camera, monitors the driver of the vehicle.

29 Claims, 4 Drawing Sheets

Related U.S. Application Data (60) Provisional application No. 63/200,003, filed on Feb. 9, 2021.

(51) Int. Cl.
    *B60R 1/12*         (2006.01)
    *B60R 11/00*       (2006.01)
    *B60R 11/04*       (2006.01)
    *G03B 17/56*       (2021.01)
    *G06V 20/59*       (2022.01)
    *G06V 40/10*       (2022.01)
    *H04N 23/55*       (2023.01)
    *H04N 23/58*       (2023.01)
    *H04N 23/80*       (2023.01)

(52) U.S. Cl.
    CPC ............ *G06V 20/59* (2022.01); *G06V 40/103* (2022.01); *H04N 23/55* (2023.01); *H04N 23/58* (2023.01); *H04N 23/80* (2023.01); *B60R 1/04* (2013.01); *B60R 2001/1253* (2013.01); *B60R 2011/0033* (2013.01); *B60R 2011/0087* (2013.01); *B60R 2011/0089* (2013.01)

(58) Field of Classification Search
    CPC ..... B60R 2011/0033; B60R 2011/0087; B60R 2011/0089; B60R 2011/0091; B60R 2300/8006; B60R 1/00; B60R 2300/70; B60R 2300/80; B60R 2300/802; B60R 11/04; B60R 2001/1215; B60R 11/0235; B60R 2011/0276; B60R 2300/205; G06V 10/147; G06V 20/58; G06V 20/59; G06V 20/597; G06V 20/593; B60K 2370/176; B60K 2370/1868; B60K 2370/21; B60K 2370/52; B60K 2370/797; B60K 35/00; B60K 2370/152; B60K 2370/1526; B60K 2370/1529; B60K 2370/1531; B60K 2370/1533; B60K 2370/736; B60K 2370/739; B60K 2370/149; B60K 2370/194; B60K 2370/741; H04N 7/181; G02B 27/01
    USPC ....................................................... 348/148
    See application file for complete search history.

(56) References Cited

U.S. PATENT DOCUMENTS

| | | |
|---|---|---|
| 5,570,127 A | 10/1996 | Schmidt |
| 5,670,935 A | 9/1997 | Schofield et al. |
| 5,760,962 A | 6/1998 | Schofield et al. |
| 5,796,094 A | 8/1998 | Schofield et al. |
| 5,877,897 A | 3/1999 | Schofield et al. |
| 6,097,023 A | 8/2000 | Schofield et al. |
| 6,158,655 A | 12/2000 | DeVries, Jr. et al. |
| 6,483,438 B2 | 11/2002 | DeLine et al. |
| 6,552,342 B2 | 4/2003 | Holz et al. |
| 6,593,565 B2 | 7/2003 | Heslin et al. |
| 6,627,918 B2 | 9/2003 | Getz et al. |
| 6,690,268 B2 | 2/2004 | Schofield et al. |
| 6,703,925 B2 | 3/2004 | Steffel |
| 6,824,281 B2 | 11/2004 | Schofield et al. |
| 7,038,577 B2 | 5/2006 | Pawlicki et al. |
| 7,184,190 B2 | 2/2007 | McCabe et al. |
| 7,195,381 B2 | 3/2007 | Lynam et al. |
| 7,224,324 B2 | 5/2007 | Quist et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,338,177 B2 | 3/2008 | Lynam |
| 7,360,932 B2 | 4/2008 | Uken et al. |
| 7,420,756 B2 | 9/2008 | Lynam |
| 7,477,758 B2 | 1/2009 | Piirainen et al. |
| 7,480,149 B2 | 1/2009 | DeWard et al. |
| 7,626,749 B2 | 12/2009 | Baur et al. |
| 7,720,580 B2 | 5/2010 | Higgins-Luthman |
| 7,855,755 B2 | 12/2010 | Weller et al. |
| 7,914,187 B2 | 3/2011 | Higgins-Luthman et al. |
| 8,049,640 B2 | 11/2011 | Uken et al. |
| 8,258,932 B2 | 9/2012 | Wahlstrom |
| 8,446,470 B2 | 5/2013 | Lu et al. |
| 8,451,107 B2 | 5/2013 | Lu et al. |
| 8,508,831 B2 | 8/2013 | De Wind et al. |
| 8,529,108 B2 | 9/2013 | Uken et al. |
| 8,730,553 B2 | 5/2014 | De Wind et al. |
| 8,743,203 B2 | 6/2014 | Karner et al. |
| 8,876,342 B2 | 11/2014 | Wimbert et al. |
| 8,922,422 B2 | 12/2014 | Klar et al. |
| 9,090,213 B2 | 7/2015 | Lawlor et al. |
| 9,126,525 B2 | 9/2015 | Lynam et al. |
| 9,174,578 B2 | 11/2015 | Uken et al. |
| 9,280,202 B2 | 3/2016 | Gieseke et al. |
| 9,346,403 B2 | 5/2016 | Uken et al. |
| 9,405,120 B2 | 8/2016 | Graf et al. |
| 9,487,159 B2 | 11/2016 | Achenbach |
| 9,493,122 B2 | 11/2016 | Krebs |
| 9,598,016 B2 | 3/2017 | Blank et al. |
| 9,609,757 B2 | 3/2017 | Steigerwald |
| 9,701,258 B2 | 7/2017 | Tiryaki |
| 9,827,913 B2 | 11/2017 | De Wind et al. |
| 9,878,669 B2 | 1/2018 | Kendall |
| 9,900,490 B2 | 2/2018 | Ihlenburg et al. |
| 10,017,114 B2 | 7/2018 | Bongwald |
| 10,029,614 B2 | 7/2018 | Larson |
| 10,046,706 B2 | 8/2018 | Larson et al. |
| 10,065,574 B2 | 9/2018 | Tiryaki |
| 10,166,924 B2 | 1/2019 | Baur |
| 10,166,926 B2 | 1/2019 | Krebs et al. |
| 10,247,941 B2 | 4/2019 | Fursich |
| 10,261,648 B2 | 4/2019 | Uken et al. |
| 10,315,573 B2 | 6/2019 | Bongwald |
| 10,421,404 B2 | 9/2019 | Larson et al. |
| 10,442,360 B2 | 10/2019 | LaCross et al. |
| 10,466,563 B2 | 11/2019 | Kendall et al. |
| 10,525,883 B2 | 1/2020 | Goseberg et al. |
| 10,567,633 B2 | 2/2020 | Ihlenburg et al. |
| 10,567,705 B2 | 2/2020 | Ziegenspeck et al. |
| 10,703,204 B2 | 7/2020 | Hassan et al. |
| 10,769,434 B2 | 9/2020 | Weller et al. |
| 10,906,463 B2 | 2/2021 | Pflug et al. |
| 10,908,417 B2 | 2/2021 | Fürsich |
| 10,922,563 B2 | 2/2021 | Nix et al. |
| 10,946,798 B2 | 3/2021 | Fürsich et al. |
| 10,948,798 B2 | 3/2021 | Lynam et al. |
| 10,958,830 B2 | 3/2021 | Koravadi |
| 10,967,796 B2 | 4/2021 | Uken et al. |
| 11,167,771 B2 | 11/2021 | Caron et al. |
| 11,205,083 B2 | 12/2021 | Lynam |
| 11,214,199 B2 | 1/2022 | LaCross et al. |
| 11,240,427 B2 | 2/2022 | Koravadi |
| 11,242,008 B2 | 2/2022 | Blank et al. |
| 11,247,609 B2 | 2/2022 | Fürsich et al. |
| 11,252,376 B2 | 2/2022 | Ihlenburg |
| 11,341,671 B2 | 5/2022 | Lu et al. |
| 11,348,374 B2 | 5/2022 | Kramer et al. |
| 11,433,906 B2 | 9/2022 | Lu |
| 11,465,561 B2 | 10/2022 | Peterson et al. |
| 11,488,399 B2 | 11/2022 | Wacquant |
| 11,493,918 B2 | 11/2022 | Singh |
| 11,518,401 B2 | 12/2022 | Kulkarni |
| 11,582,425 B2 | 2/2023 | Liu |
| 11,972,597 B2 | 4/2024 | Rother et al. |
| 2001/0022550 A1 | 9/2001 | Steffel |
| 2002/0005999 A1 | 1/2002 | Hutzel et al. |
| 2002/0024713 A1 | 2/2002 | Roberts et al. |
| 2004/0252993 A1 | 12/2004 | Sato |
| 2006/0050018 A1 | 3/2006 | Hutzel et al. |
| 2007/0182528 A1 | 8/2007 | Breed et al. |
| 2008/0310005 A1 | 12/2008 | Tonar et al. |
| 2009/0040778 A1 | 2/2009 | Takayanagi et al. |

(56) References Cited

U.S. PATENT DOCUMENTS

| | | |
|---|---|---|
| 2009/0135493 A1 | 5/2009 | Takayanagi et al. |
| 2010/0085653 A1 | 4/2010 | Uken et al. |
| 2011/0080481 A1 | 4/2011 | Bellingham |
| 2011/0188122 A1 | 8/2011 | Habibi et al. |
| 2012/0236136 A1 | 9/2012 | Boddy |
| 2014/0022390 A1 | 1/2014 | Blank et al. |
| 2014/0285666 A1 | 9/2014 | O'Connell et al. |
| 2014/0293169 A1 | 10/2014 | Uken et al. |
| 2014/0313563 A1 | 10/2014 | Uken et al. |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0097955 A1 | 4/2015 | De Wind et al. |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0044284 A1 | 2/2016 | Goseberg et al. |
| 2016/0137126 A1 | 5/2016 | Fursich et al. |
| 2016/0209647 A1 | 7/2016 | Fursich |
| 2016/0221509 A1 | 8/2016 | Takada et al. |
| 2017/0217367 A1 | 8/2017 | Pflug et al. |
| 2017/0237946 A1 | 8/2017 | Schofield et al. |
| 2017/0274906 A1 | 9/2017 | Hassan et al. |
| 2017/0355312 A1 | 12/2017 | Habibi et al. |
| 2017/0355314 A1* | 12/2017 | May .................. H04N 23/635 |
| 2018/0134217 A1 | 5/2018 | Peterson et al. |
| 2018/0222414 A1 | 8/2018 | Ihlenburg et al. |
| 2018/0231976 A1 | 8/2018 | Singh |
| 2018/0304727 A1 | 10/2018 | Choi et al. |
| 2019/0009786 A1 | 1/2019 | Liu |
| 2019/0054899 A1 | 2/2019 | Hoyos et al. |
| 2019/0118717 A1 | 4/2019 | Blank et al. |
| 2019/0146297 A1 | 5/2019 | Lynam et al. |
| 2019/0168669 A1 | 6/2019 | Lintz et al. |
| 2019/0188504 A1 | 6/2019 | Aihara et al. |
| 2019/0258131 A9 | 8/2019 | Lynam et al. |
| 2019/0364199 A1 | 11/2019 | Koravadi |
| 2019/0381938 A1* | 12/2019 | Hopkins .................. G06F 3/013 |
| 2020/0133390 A1 | 4/2020 | Patton |
| 2020/0143560 A1 | 5/2020 | Lu et al. |
| 2020/0148120 A1 | 5/2020 | Englander et al. |
| 2020/0202151 A1 | 6/2020 | Wacquant |
| 2020/0320320 A1 | 10/2020 | Lynam |
| 2020/0327323 A1 | 10/2020 | Noble |
| 2020/0377022 A1 | 12/2020 | LaCross et al. |
| 2021/0056306 A1 | 2/2021 | Hu et al. |
| 2021/0122404 A1 | 4/2021 | Lisseman et al. |
| 2021/0155167 A1 | 5/2021 | Lynam et al. |
| 2021/0162926 A1 | 6/2021 | Lu |
| 2021/0245662 A1 | 8/2021 | Blank et al. |
| 2021/0291739 A1 | 9/2021 | Kasarla et al. |
| 2021/0306538 A1 | 9/2021 | Solar |
| 2021/0316663 A1 | 10/2021 | Buerkle et al. |
| 2021/0323473 A1 | 10/2021 | Peterson et al. |
| 2021/0368082 A1 | 11/2021 | Solar |
| 2022/0111857 A1 | 4/2022 | Kulkarni |
| 2022/0229309 A1 | 7/2022 | Laskin et al. |
| 2022/0242438 A1 | 8/2022 | Sobecki et al. |
| 2022/0254132 A1 | 8/2022 | Rother |
| 2022/0377219 A1 | 11/2022 | Conger et al. |
| 2023/0131471 A1 | 4/2023 | Sobecki et al. |
| 2023/0137004 A1 | 5/2023 | Huizen et al. |
| 2023/0302994 A1 | 9/2023 | Miller et al. |
| 2024/0017610 A1 | 1/2024 | Ravichandran et al. |
| 2024/0064274 A1 | 2/2024 | Blank et al. |

* cited by examiner

VEHICULAR DRIVER MONITORING SYSTEM WITH CAMERA VIEW OPTIMIZATION

CROSS REFERENCE TO RELATED APPLICATIONS

The present application is a continuation of U.S. patent application Ser. No. 17/650,255, filed Feb. 8, 2022, now U.S. Pat. No. 11,972,597, which claims the filing benefits of U.S. provisional application Ser. No. 63/200,003, filed Feb. 9, 2021, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driving assistance system or vision system or imaging system for a vehicle that includes a camera disposed at an interior rearview mirror of a vehicle equipped with the vehicular driver assist system and viewing interior of the vehicle. The camera captures image data. The system includes an electronic control unit (ECU) that has electronic circuitry and associated software. The electronic circuitry of the ECU includes an image processor for processing image data captured by the camera to detect presence of objects (e.g., a vehicle driver and/or passenger) in the field of view of the camera. The camera includes an imaging array sensor and a lens. The lens is disposed at the imaging array sensor with a center axis of the lens vertically offset from a center region of the imaging array sensor such that a center region of the lens is disposed at and images at a lower region of the imaging array sensor when the camera is disposed at the interior rearview mirror, and an upper peripheral region of the lens images at the center region and a lower region of the imaging array sensor when the camera is disposed at the interior rearview mirror. The ECU, responsive to processing by the image processor of image data captured by the camera, determines presence of an occupant of the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture data of an interior of the vehicle and may process the data to detect objects within the vehicle. The system includes a processor or processing system that is operable to receive data from one or more sensors.

Figure 1:
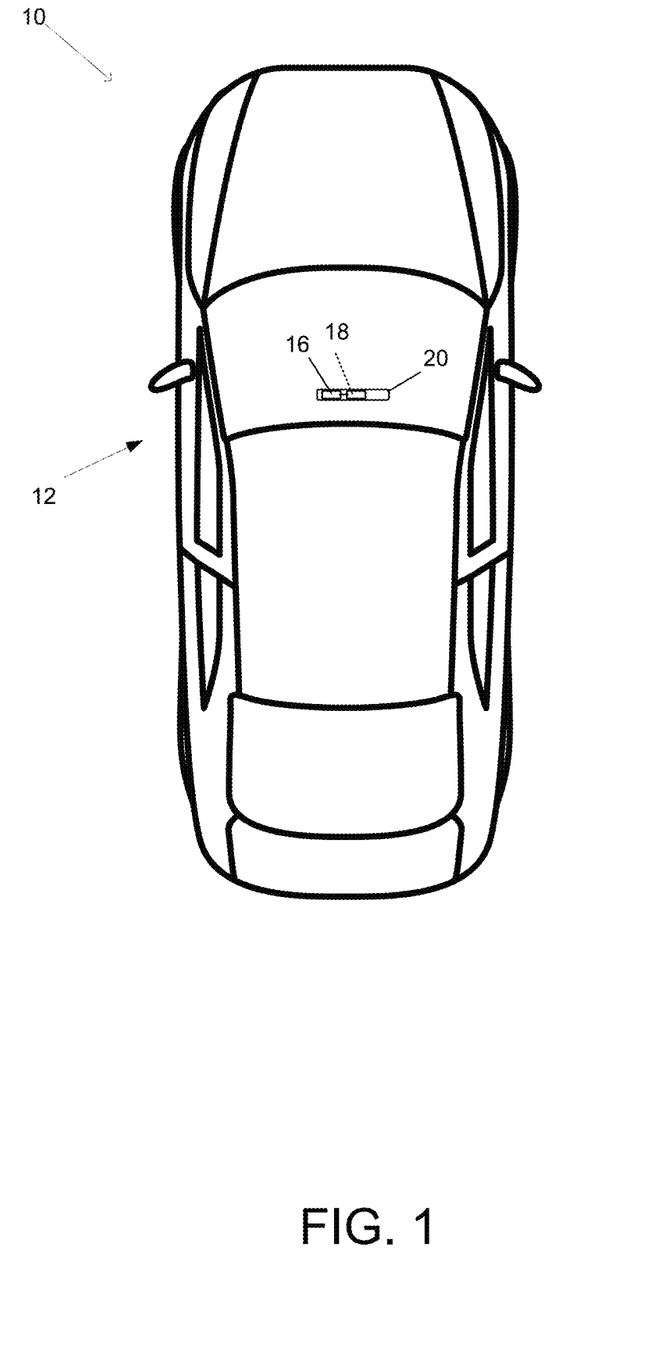
FIG. 1 is a plan view of a vehicle with a vision system that incorporates cameras in accordance with the present invention.

Referring now to the drawings and the illustrative embodiments depicted therein, a vehicle 10 includes a sensing system or driver assist system 12 that includes at least one interior viewing imaging sensor or camera, such as a rearview mirror imaging sensor or camera 16 (FIG. 1). Optionally, an interior viewing camera may be disposed at the windshield of the vehicle. The vision system 12 includes a control or electronic control unit (ECU) 18 having electronic circuitry and associated software, with the electronic circuitry including a data processor or image processor that is operable to process image data captured by the sensor or camera or cameras, whereby the ECU may detect or determine presence of objects or the like (although shown in FIG. 1 as being part of or incorporated in or at an interior rearview mirror assembly 20 of the vehicle, the control and/or the display device may be disposed elsewhere at or in the vehicle). The data transfer or signal communication from the sensor or camera to the ECU may comprise any suitable data or communication link, such as a vehicle network bus or the like of the equipped vehicle.

Figure 2:
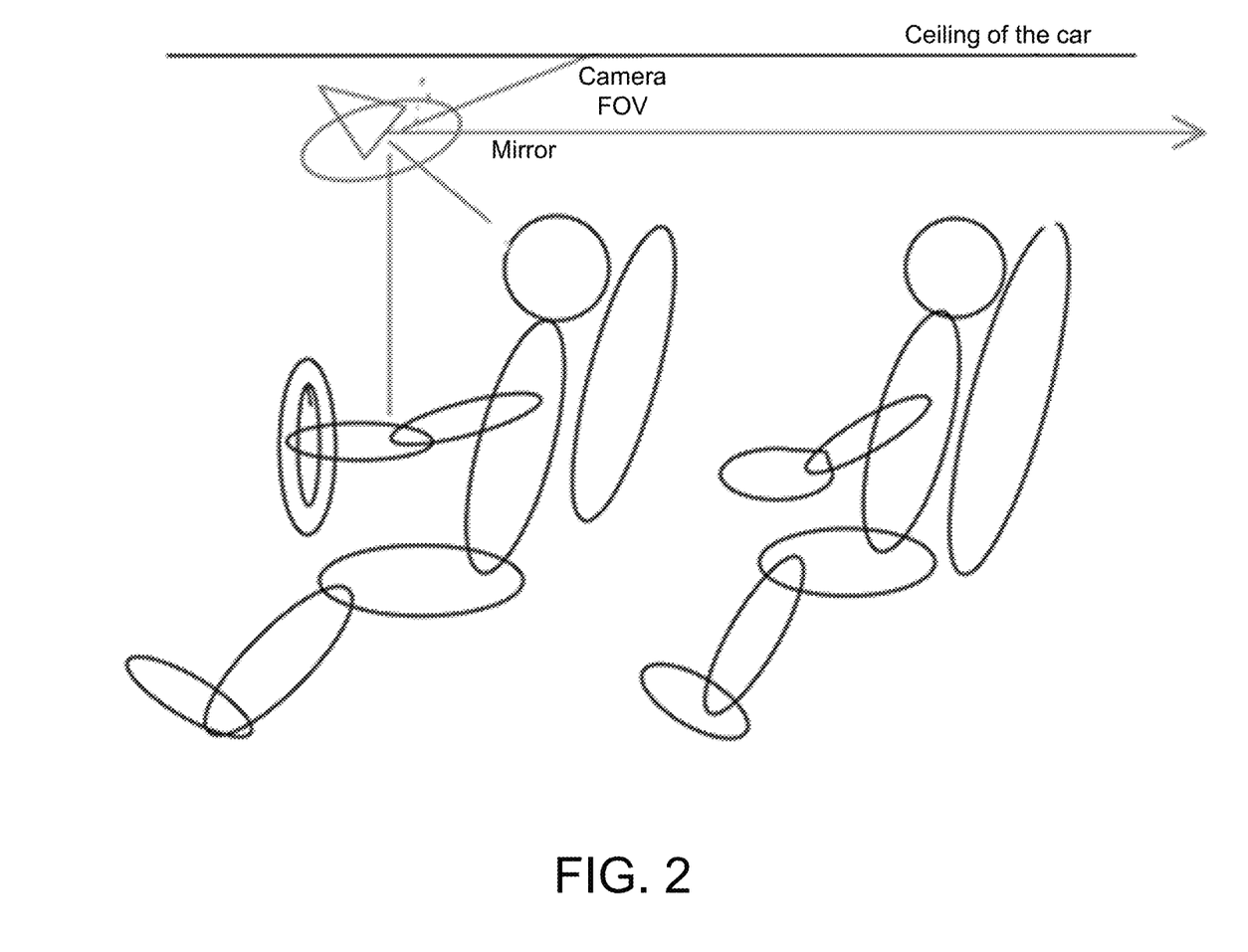
FIG. 2 is a side view of an interior of a vehicle with an interior camera.

Referring now to FIG. 2, in some driver monitoring systems or driver assist systems, an interior camera is attached to or is mounted within the interior rearview mirror to, for example, monitor the interior of the vehicle. Thus, when the driver adjusts the rearview mirror (i.e., rotates, tilts, or otherwise moves the interior rearview mirror to adjust the driver's rearward view), the field of view of the interior camera is also changed. The change in the field of view of the camera may lead to blind spots in the surveillance of the cabin or otherwise decrease the effectiveness of the interior camera. For example, some areas of the cabin (e.g., the driver or other occupant) may be captured by a lower resolution portion of the image sensor of the camera as the resolution may decrease in outer regions of the field of view of the camera (such as due to distortion in the image data imaged at the imager by a wide angle or curved or spherical lens). As shown in FIG. 2, the field of view of the camera is suboptimal, as a large portion of the field of view of the camera is of the ceiling or roofliner or headliner of the vehicle.

Figure 3:
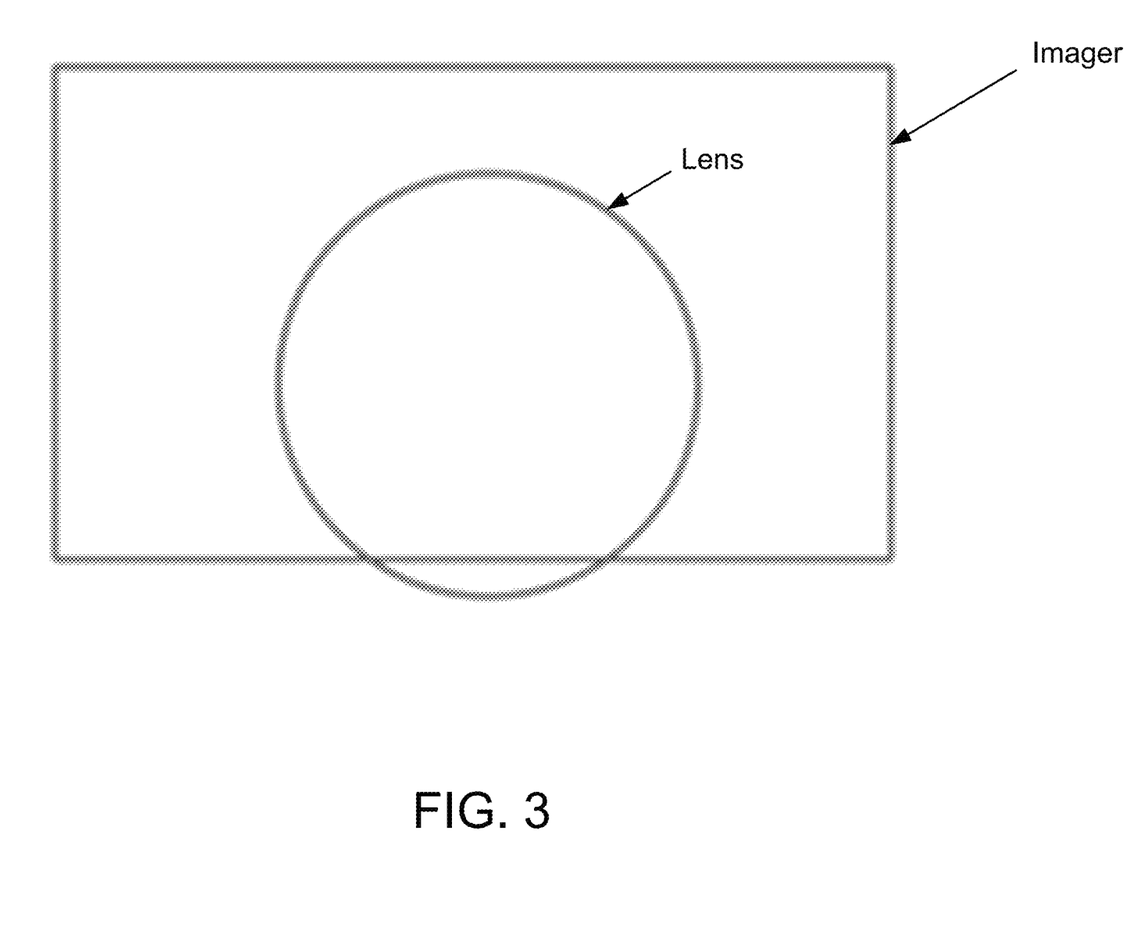
FIG. 3 is a plan view of an outline of a lens over an outline of an imager of the camera of the vision system of FIG. 1.
Figure 4:
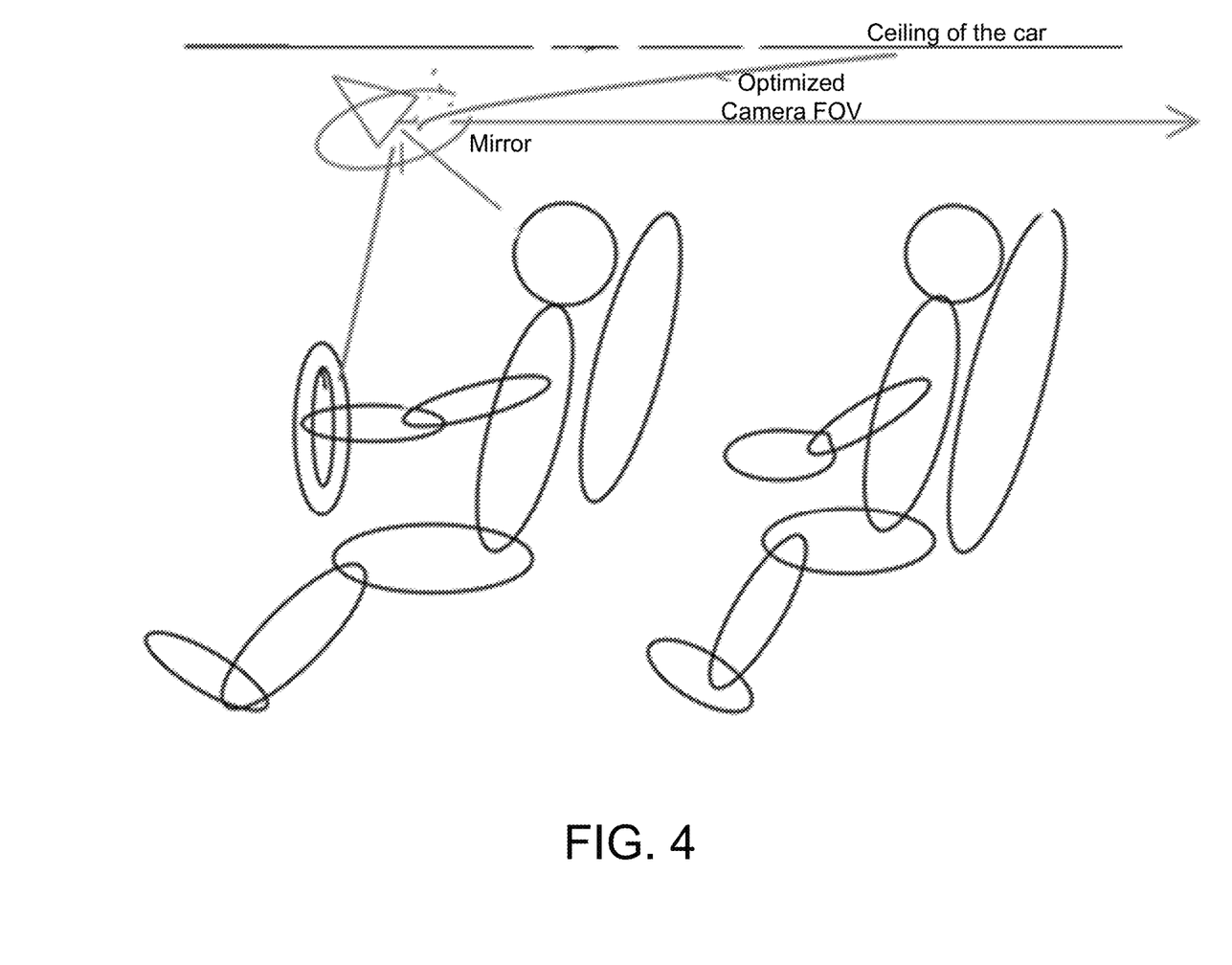
FIG. 4 is a side view of an interior of a vehicle with the vision system of FIG. 1.

Implementations herein include a vehicular driver monitoring system that may align a lens of the camera vertically and/or horizontally offset from a center of the image sensor (FIGS. 3 and 4). For example, and such as shown in FIG. 3, the lens may be disposed at the imaging sensor with a center axis of the lens vertically offset from a center region of the imaging array sensor and a center region of the lens is disposed at and images at a lower region of the imaging array sensor when the camera is disposed at the interior rearview mirror. An upper peripheral region of the lens may image at the center region and a lower region of the imaging array sensor when the camera is disposed at the interior rearview mirror (FIG. 4). By doing this, regions of low interest (e.g., the roofliner or ceiling of the vehicle) may be imaged by a lower resolution or more distorted portion of the lens/image sensor (e.g., edges of the lens or edges of the image sensor) while regions of high interest (e.g., portions where occupants heads are likely to be) are imaged with a higher resolution or with less distortion as these regions such as areas that are more centrally located with respect to the lens. The lens and imager construction may utilize aspects of the cameras and systems described in U.S. Pat. No. 10,525, 883 and/or U.S. Publication No. US-2016-0137126, which are both hereby incorporated herein by reference in their entireties.

Optionally, the system or camera may adjust the location of the lens respective to the image sensor based on adjustments to the interior rearview mirror (i.e., by the driver). That is, when the driver of the vehicle adjusts the interior rearview mirror, the system may, in response, adjust the position of the lens relative to the image sensor to maintain an optimal field of view within the cabin of the vehicle using, for example, actuators, motors, or the like. For example, the field of view of the camera is adjusted such that the field of view includes less of low priority areas of the cabin (e.g., the roof) and the field of view includes more of high priority areas (e.g., the occupants).

Optionally, the vehicular driver monitoring system may include a gimbal or gear system or other pivoted support or mounting system for the camera. Such a mounting system decouples the field of view of the camera with the orientation of the mirror. For example, when the driver adjusts the mirror, the mounting system (e.g., the gimbal, ball and socket joint, etc.) adjusts the camera so that the field of view of the camera remains the same. The mounting system may allow adjustment of the camera about a single axis or about two or three axes. Thus, even with a very tall or very short driver who makes extreme adjustments to the mirror, the camera can maintain an optimal or ideal field of view. For example, when the driver moves the field of view off the mirror higher, the field of view of the camera may remain relatively lower of the cabin of the vehicle.

Optionally, the camera may alternatively or additionally (i.e., in addition to functioning as an interior driver or occupant monitoring camera) function as a light detector for an auto dimmable mirror. For example, the camera may measure ambient light and/or glare light (e.g., from headlights of vehicles behind the equipped vehicle) and the rear-view mirror and/or side mirrors may dim based on the measurements. Thus, other redundant light detectors or sensors may be removed to reduce costs. Such a camera and ambient light sensing system may utilize aspects of the cameras and systems described in U.S. Publication Nos. US-2021-0316663; US-2021-0245662; US-2019-0146297 and/or US-2019-0047475, and/or International PCT Application No. PCT/US22/70062, filed Jan. 6, 2022, and published Jul. 14, 2022 as International Publication No. WO 2022/150826, which are all hereby incorporated herein by reference in their entireties.

Optionally, the ECU, based on image data captured by the interior camera, calculate areas of vehicle mirrors (e.g., rearview mirror, side mirrors, etc.) that should be dimmed when the driver or other occupants are at risk of glare from a light source from behind the vehicle. That is, based on the captured image data, only portions of the mirror may be dimmed (i.e., the portions that reflect the detected glare light). The ECU may perform the calculations via, for example, triangulation of the mirror(s) and the camera positions. Thus, using the captured image data, the mirror may function as a high-dynamic-range (HDR) mirror. The ECU may use the resolution of the camera to create coordinates (e.g., Cartesian coordinates) of the dimmable area of the mirror. For example, the ECU may define the mirror surface as an array or foil or pixelated structure where each element or portion or region or sub-array of pixels may be selectively or individually dimmed.

The system thus may determine a location of the driver's head and/or eyes, and may determine when glare light (emanating from a headlight of a vehicle rearward of the equipped vehicle) may reflect off the interior mirror reflective element (or exterior mirror reflective element at either side of the vehicle) toward the driver's eyes. Based on the determined location of the driver's head/eyes and the location of the rearward light source relative to the vehicle and mirrors, the system determines which area of each mirror reflective element to dim to reduce or limit or avoid glare light to the driver of the vehicle. The system may utilize aspects of the adaptive masks and systems described in U.S. Publication Nos. US-2021-0114439 and/or US-2020-0296273, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver monitoring system, the vehicular driver monitoring system comprising:
    a camera disposed at a mirror head of an interior rearview mirror of a vehicle equipped with the vehicular driver monitoring system and viewing interior of the vehicle, the camera capturing image data;
    wherein the mirror head accommodates a mirror reflective element;
    wherein orientation of the mirror head is adjustable by a driver of the vehicle to adjust a rearward view of the driver;
    wherein the camera moves together and in tandem with the mirror head when the mirror head is adjusted by the driver of the vehicle;
    wherein the camera comprises a CMOS imaging array, and wherein the CMOS imaging array comprises at least one million photosensors arranged in rows and columns;
    an electronic control unit (ECU) comprising electronic circuitry and associated software;
    wherein the electronic circuitry of the ECU comprises an image processor for processing image data captured by the camera;
    wherein the camera views at least the head of the driver of the vehicle;
    wherein the camera comprises a mounting system that adjustably mounts the camera to the mirror head of the interior rearview mirror;
    wherein, responsive to the driver of the vehicle adjusting the orientation of the mirror head, and responsive to processing at the ECU of image data captured by the camera, the vehicular driver monitoring system adjusts the mounting system so that the camera adjusts relative to the mirror head to maintain the view of at least the head of the driver of the vehicle as it was before the driver adjusted the orientation of the mirror head; and
    wherein the vehicular driver monitoring system, at least in part via processing at the ECU of image data captured by the camera, monitors the driver of the vehicle.

2. The vehicular driver monitoring system of claim 1, wherein the mounting system comprises a gimbal.

3. The vehicular driver monitoring system of claim 2, wherein the mounting system comprises a ball-and-socket joint.

4. The vehicular driver monitoring system of claim 1, wherein the mounting system adjusts the orientation of the camera relative to the mirror head about a single axis.

5. The vehicular driver monitoring system of claim 1, wherein the mounting system adjusts the orientation of the camera relative to the mirror head about a plurality of axes.

6. The vehicular driver monitoring system of claim 5, wherein the plurality of axes comprises three axes.

7. The vehicular driver monitoring system of claim 1, wherein the camera comprises a lens disposed at the CMOS imaging array with a centerline of the lens that does not pass through a center of the CMOS imaging array, and wherein, with the camera disposed at the interior rearview mirror, a center region of the lens is disposed at and images at a lower region of the CMOS imaging array and an upper region of the lens images at the center region of the CMOS imaging array.

8. The vehicular driver monitoring system of claim 7, wherein a vertical offset of the lens relative to the CMOS imaging array increases resolution of image data captured by the camera.

9. The vehicular driver monitoring system of claim 7, wherein a vertical offset of the lens relative to the CMOS imaging array decreases distortion in image data captured by the camera.

10. The vehicular driver monitoring system of claim 1, wherein the mirror reflective element comprises a dimmable mirror reflective element, and wherein the vehicular driver monitoring system, responsive to processing by the image processor of image data captured by the camera, determines intensity of glare light, and wherein the vehicular driver monitoring system, responsive to determining that the intensity of glare light is greater than a threshold level, at least partially dims the dimmable mirror reflective element.

11. The vehicular driver monitoring system of claim 10, wherein, based at least in part on processing of image data captured by the camera, the vehicular driver monitoring system determines a portion of the dimmable mirror reflective element that is reflecting glare light toward eyes of the driver of the vehicle, and wherein the vehicular driver monitoring system, responsive to determining the portion of the dimmable mirror reflective element that is reflecting the glare light, dims the portion of the dimmable mirror reflective element that is reflecting the glare light while not dimming other portions of the dimmable mirror reflective element that are not reflecting the glare light.

12. The vehicular driver monitoring system of claim 11, wherein the vehicular driver monitoring system determines the portion of the dimmable mirror reflective element that is reflecting the glare light based on triangulation and a position of the dimmable mirror reflective element and the camera.

13. The vehicular driver monitoring system of claim 12, wherein the vehicular driver monitoring system determines the portion of the dimmable mirror reflective element based on an array of locations that represent a surface of the dimmable mirror reflective element.

14. A vehicular driver monitoring system, the vehicular driver monitoring system comprising:
- a camera disposed at a mirror head of an interior rearview mirror of a vehicle equipped with the vehicular driver monitoring system and viewing interior of the vehicle, the camera capturing image data;
- wherein the mirror head accommodates a mirror reflective element;
- wherein orientation of the mirror head is adjustable by a driver of the vehicle to adjust a rearward view of the driver;
- wherein the camera moves together and in tandem with the mirror head when the mirror head is adjusted by the driver of the vehicle;
- wherein the camera comprises a CMOS imaging array and a lens, and wherein the CMOS imaging array comprises at least one million photosensors arranged in rows and columns;
- wherein the lens is disposed at the CMOS imaging array with a centerline of the lens that does not pass through a center of the CMOS imaging array, and wherein, with the camera disposed at the interior rearview mirror, a center region of the lens is disposed at and images at a lower region of the CMOS imaging array and an upper region of the lens images at the center region of the CMOS imaging array;
- wherein a vertical offset of the lens relative to the CMOS imaging array decreases distortion of images imaged at the lower region of the CMOS imaging array;
- an electronic control unit (ECU) comprising electronic circuitry and associated software;
- wherein the electronic circuitry of the ECU comprises an image processor for processing image data captured by the camera;
- wherein the camera views at least the head of the driver of the vehicle such that the head of the driver is imaged at the lower region of the CMOS imaging array;
- wherein, responsive to the driver of the vehicle adjusting the orientation of the mirror head, and responsive to processing at the ECU of image data captured by the camera, the vehicular driver monitoring system maintains the camera's view of at least the head of the driver of the vehicle as it was before the driver adjusted the orientation of the mirror head; and
- wherein the vehicular driver monitoring system, at least in part via processing at the ECU of image data captured by the camera, monitors the driver of the vehicle.

15. The vehicular driver monitoring system of claim 14, wherein the vehicular driver monitoring system adjusts orientation of the camera relative to the mirror head about a single axis to maintain the camera's view of at least the head of the driver of the vehicle.

16. The vehicular driver monitoring system of claim 14, wherein the vehicular driver monitoring system adjusts orientation of the camera relative to the mirror head about a plurality of axes to maintain the camera's view of at least the head of the driver of the vehicle.

17. The vehicular driver monitoring system of claim 16, wherein the plurality of axes comprises three axes.

18. The vehicular driver monitoring system of claim 14, wherein the vertical offset of the lens relative to the CMOS imaging array increases resolution of image data captured by the camera at the lower region of the CMOS imaging array.

19. The vehicular driver monitoring system of claim 14, wherein the mirror reflective element comprises a dimmable mirror reflective element, and wherein the vehicular driver monitoring system, responsive to processing by the image processor of image data captured by the camera, determines intensity of glare light, and wherein the vehicular driver monitoring system, responsive to determining that the intensity of glare light is greater than a threshold level, at least partially dims the dimmable mirror reflective element.

20. The vehicular driver monitoring system of claim 19, wherein, based at least in part on processing of image data captured by the camera, the vehicular driver monitoring system determines a portion of the dimmable mirror reflective element that is reflecting glare light toward eyes of the driver of the vehicle, and wherein the vehicular driver monitoring system, responsive to determining the portion of the dimmable mirror reflective element that is reflecting the glare light, dims the portion of the dimmable mirror reflective element that is reflecting the glare light while not dimming other portions of the dimmable mirror reflective element that are not reflecting the glare light.

21. The vehicular driver monitoring system of claim 20, wherein the vehicular driver monitoring system determines the portion of the dimmable mirror reflective element that is reflecting the glare light based on triangulation and a position of the dimmable mirror reflective element and the camera.

22. The vehicular driver monitoring system of claim 21, wherein the vehicular driver monitoring system determines the portion of the dimmable mirror reflective element based on an array of locations that represent a surface of the dimmable mirror reflective element.

23. A vehicular driver monitoring system, the vehicular driver monitoring system comprising:
- a camera disposed at a mirror head of an interior rearview mirror of a vehicle equipped with the vehicular driver monitoring system and viewing interior of the vehicle, the camera capturing image data;
- wherein the mirror head accommodates a dimmable mirror reflective element;
- wherein orientation of the mirror head is adjustable by a driver of the vehicle to adjust a rearward view of the driver;
- wherein the camera moves together and in tandem with the mirror head when the mirror head is adjusted by the driver of the vehicle;
- wherein the camera comprises a CMOS imaging array, and wherein the CMOS imaging array comprises at least one million photosensors arranged in rows and columns;
- an electronic control unit (ECU) comprising electronic circuitry and associated software;

wherein the electronic circuitry of the ECU comprises an image processor for processing image data captured by the camera;

wherein the camera views at least the head of the driver of the vehicle;

wherein, based at least in part on processing of image data captured by the camera, the vehicular driver monitoring system determines a portion of the dimmable mirror reflective element that is reflecting glare light toward eyes of the driver of the vehicle, and wherein the vehicular driver monitoring system, responsive to determining the portion of the dimmable mirror reflective element that is reflecting the glare light, dims the portion of the dimmable mirror reflective element that is reflecting the glare light while not dimming other portions of the dimmable mirror reflective element that are not reflecting the glare light;

wherein, responsive to the driver of the vehicle adjusting the orientation of the mirror head, and responsive to processing at the ECU of image data captured by the camera, the vehicular driver monitoring system maintains the camera's view of at least the head of the driver of the vehicle as it was before the driver adjusted the orientation of the mirror head; and wherein the vehicular driver monitoring system, at least in part via processing at the ECU of image data captured by the camera, monitors the driver of the vehicle.

24. The vehicular driver monitoring system of claim 23, wherein the vehicular driver monitoring system adjusts orientation of the camera relative to the mirror head about a single axis to maintain the camera's view of at least the head of the driver of the vehicle.

25. The vehicular driver monitoring system of claim 23, wherein the vehicular driver monitoring system adjusts orientation of the camera relative to the mirror head about a plurality of axes to maintain the camera's view of at least the head of the driver of the vehicle.

26. The vehicular driver monitoring system of claim 25, wherein the plurality of axes comprises three axes.

27. The vehicular driver monitoring system of claim 23, wherein the vehicular driver monitoring system, responsive to processing by the image processor of image data captured by the camera, determines intensity of the glare light, and wherein the vehicular driver monitoring system, responsive to determining that the intensity of the glare light is greater than a threshold level, at least partially dims the portion of the dimmable mirror reflective element.

28. The vehicular driver monitoring system of claim 23, wherein the vehicular driver monitoring system determines the portion of the dimmable mirror reflective element that is reflecting the glare light based on triangulation and a position of the dimmable mirror reflective element and the camera.

29. The vehicular driver monitoring system of claim 23, wherein the vehicular driver monitoring system determines the portion of the dimmable mirror reflective element based on an array of locations that represent a surface of the dimmable mirror reflective element.

* * * * *